United States Patent
Okabayashi

(10) Patent No.: US 10,009,845 B2
(45) Date of Patent: Jun. 26, 2018

(54) ACTIVATION METHOD AND PORTABLE TERMINAL

(71) Applicant: FUJITSU LIMITED, Kawasaki-shi, Kanagawa (JP)

(72) Inventor: Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 15/149,877

(22) Filed: May 9, 2016

(65) Prior Publication Data
US 2016/0255587 A1 Sep. 1, 2016

Related U.S. Application Data

(63) Continuation of application No. PCT/JP2013/080385, filed on Nov. 11, 2013.

(51) Int. Cl.
| | |
|---|---|
| *H04L 1/00* | (2006.01) |
| *H04W 52/02* | (2009.01) |
| *G06F 9/448* | (2018.01) |
| *G06F 9/44* | (2018.01) |
| *H04L 12/26* | (2006.01) |

(52) U.S. Cl.
CPC ........ *H04W 52/0229* (2013.01); *G06F 9/444* (2013.01); *G06F 9/4498* (2018.02); *H04L 43/04* (2013.01); *Y02D 70/00* (2018.01); *Y02D 70/164* (2018.01)

(58) Field of Classification Search
CPC ......... H04L 47/10; H04L 47/12; H04L 47/20; H04L 47/24; H04L 47/32; H04L 47/38; H04L 47/70; H04L 47/72; H04L 47/74; H04L 47/78; H04L 47/80; H04W 28/02;
(Continued)

(56) References Cited

U.S. PATENT DOCUMENTS

| | | |
|---|---|---|
| 2006/0282498 A1 | 12/2006 | Muro |
| 2009/0070030 A1 | 3/2009 | Isoda et al. |

(Continued)

FOREIGN PATENT DOCUMENTS

| | | |
|---|---|---|
| JP | 2006-060671 | 3/2006 |
| JP | 2006-323595 | 11/2006 |

(Continued)

OTHER PUBLICATIONS

EESR—The Extended European Search Report for European Patent Application No. 13896981.1, dated Oct. 12, 2016.
(Continued)

*Primary Examiner* — Dady Chery
(74) *Attorney, Agent, or Firm* — Fujitsu Patent Center

(57) ABSTRACT

This activation method includes: determining a sequence of activation of plural detection modules each of which is configured to detect a state, for a first condition related to results of detection by the plural detection modules; first activating a detection module that is a first in the sequence; and second activating a certain detection module other than the detection module that is the first in the sequence, upon detecting that a result of detection by a first detection module whose turn in the sequence is immediately before a turn of the certain detection module satisfies a second condition which corresponds to the first detection module and is included in the first condition.

12 Claims, 15 Drawing Sheets

(58) Field of Classification Search
CPC ........... H04W 28/0205; H04W 28/021; H04W 28/0247; H04W 28/0252
USPC .............................. 370/229, 230, 235, 252
See application file for complete search history.

(56) References Cited

U.S. PATENT DOCUMENTS

| | | |
|---|---|---|
| 2009/0271111 A1 | 10/2009 | Takanashi et al. |
| 2011/0320836 A1* | 12/2011 | Johnston ............... G06F 1/3203 713/320 |
| 2012/0084317 A1 | 4/2012 | Sakamoto |

FOREIGN PATENT DOCUMENTS

| | | |
|---|---|---|
| JP | 2006-344017 | 12/2006 |
| JP | 2009-218776 | 9/2009 |
| JP | 2009-288233 | 12/2009 |
| JP | 2012-079240 | 4/2012 |

OTHER PUBLICATIONS

International Search Report and Written Opinion of the International Searching Authority (Form PCT/ISA/210, Form PCT/ISA/237), mailed in connection with PCT/JP2013/080385 and dated Feb. 4, 2014 (8 pages).

\* cited by examiner

| CONDITION | SERVICE | PARAMETER |
|---|---|---|
| d1 | α | Z |
| a2 AND c1 | β | XX MESSAGE |
| a1 AND b1 | β | YY MESSAGE |

FIG.2

| FUNCTION | AVERAGE POWER CONSUMPTION |
|---|---|
| A | 80 |
| B | 110 |
| C | 120 |
| D | 150 |
| ⋮ | ⋮ |

FIG.3

| TIME | STATE |
|---|---|
| 22:10 | FUNCTION A ON |
| 22:12 | FUNCTION B ON |
| 22:20 | FUNCTION A OFF |
| ⋮ | ⋮ |

FIG.4

| PATTERN | FIRST LEVEL | SECOND LEVEL | THIRD LEVEL | FOURTH LEVEL | JUDGEMENT VALUE |
|---|---|---|---|---|---|
| PATTERN 1 | A (FOR a1) | B (FOR b1) | C (FOR c1)<br>A (FOR a2) | CASE OF c1: ~A (FOR a2)<br>CASE OF a2: D (FOR d1) | |
| PATTERN 2 | C (FOR c1)<br>A (FOR a2) | CASE OF c1: ~A (FOR a2)<br>CASE OF a2: D (FOR d1) | A (FOR a1) | B (FOR b1) | |
| ... | ... | ... | ... | ... | ... |

FIG.14

| PATTERN | FIRST LEVEL | SECOND LEVEL | THIRD LEVEL | FOURTH LEVEL | JUDGEMENT VALUE |
|---|---|---|---|---|---|
| PATTERN 1 | A (FOR a1) | B (FOR b1) | C (FOR c1)<br>A (FOR a2) | CASE OF c1: ~A (FOR a2)<br>CASE OF a2: D (FOR d1) | 80 |
| PATTERN 2 | C (FOR c1)<br>A (FOR a2) | CASE OF c1: ~A (FOR a2)<br>CASE OF a2: D (FOR d1) | A (FOR a1) | B (FOR b1) | 100 |
| ... | ... | ... | ... | ... | ... |

FIG.20

| FUNCTION | CONDITION |
|---|---|
| A | a1, a2 |
| B | b1 |
| ⋮ | ⋮ |

FIG.16

| NUMBER OF BRANCHES | 2 |
|---|---|
| JUDGEMENT VALUE | 40 |
| SIGN | +1 |
| LEVEL | 4 |

FIG.17

| LEVEL | WEIGHT VALUE |
|---|---|
| FIRST LEVEL | 1.0 |
| SECOND LEVEL | 0.5 |
| THIRD LEVEL | 0.25 |
| ⋮ | ⋮ |

FIG.18

| LEVEL | WEIGHT VALUE |
|---|---|
| FIRST LEVEL | 1.0 |
| SECOND LEVEL | OCCURRENCE PROBABILITY OF a1 |
| THIRD LEVEL | (OCCURRENCE PROBABILITY OF a1) * (OCCURRENCE PROBABILITY OF b1) |
| ⋮ | ⋮ |

FIG.19

ACTIVATION METHOD AND PORTABLE TERMINAL

CROSS-REFERENCE TO RELATED APPLICATIONS

This application is a continuing application, filed under 35 U.S.C. section 111(a), of International Application PCT/JP2013/080385, filed on Nov. 11, 2013, the entire contents of which are incorporated herein by reference.

FIELD

This invention relates to a method for detecting states.

BACKGROUND

Modules (hereafter, referred to as detection modules), such as GPS (Global Positioning System), acceleration sensors, microphones and the like, which are used for detecting states, are mounted in portable terminals such as smartphones or tablets. Applications that use detection results from these detection modules are also mounted in portable terminals. For example, there are applications that use GPS to detect a position of a user, and to present a route to a destination, and there are applications that use a detection module for detecting behavior in order to detect the behavior of a user and to give notification when the user performs a certain behavior.

Moreover, there is a technique that uses plural detection modules to detect occurrence of events E1 to En (n is a natural number that is 2 or greater), and to execute predetermined processing. For example, assume that there is a rule that when a condition "meet Mr. b1 in conference room a1" is satisfied, a predetermined application will be activated. In this case, this is determined by using a detection module such as GPS to determine whether or not the condition "in conference room a1" is satisfied, and by using a detection module for human detection to determine whether or not the condition "meet Mr. b1" is satisfied. Then, when both conditions are satisfied, a predetermined application of a portable terminal is activated.

However, because a capacity of a battery mounted in the portable terminal is limited, there is a problem in that an amount of time that a user can use the portable terminal is shortened, when much power is consumed by operating plural detection modules. In conventional techniques, attention is not paid to an amount of power consumed when plural detection modules of a portable terminal were operated.

Patent Document 1: Japanese Laid-open Patent Publication No. 2012-79240

SUMMARY

A portable terminal related to this invention includes: plural detection modules each of which is configured to detect a state; a memory; and a processor configured to use the memory and execute a process. And the process includes: determining a sequence of activation of the plural detection modules, for a first condition related to results of detection by the plural detection modules; first activating a detection module that is a first in the sequence; and second activating a certain detection module other than the detection module that is the first in the sequence, upon detecting that a result of detection by a first detection module whose turn in the sequence is immediately before a turn of the certain detection module satisfies a second condition which corresponds to the first detection module and is included in the first condition.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram depicting an example of data stored in a rule data storage unit;

FIG. 3 is a diagram depicting an example of data stored in a power data storage unit;

FIG. 4 is a diagram depicting an example of data stored in a state log storage unit;

FIG. 14 is a diagram depicting a pattern of an activation sequence;

FIG. 16 is a diagram depicting an example of a function table;

FIG. 17 is a diagram depicting setting values for the calculation processing;

FIG. 18 is a diagram depicting an example of weight values;

FIG. 19 is a diagram depicting an example of weight values;

FIG. 20 is a diagram depicting an example of a judgement value calculated for each pattern;

DESCRIPTION OF EMBODIMENTS

[Embodiment 1]

Figure 1:
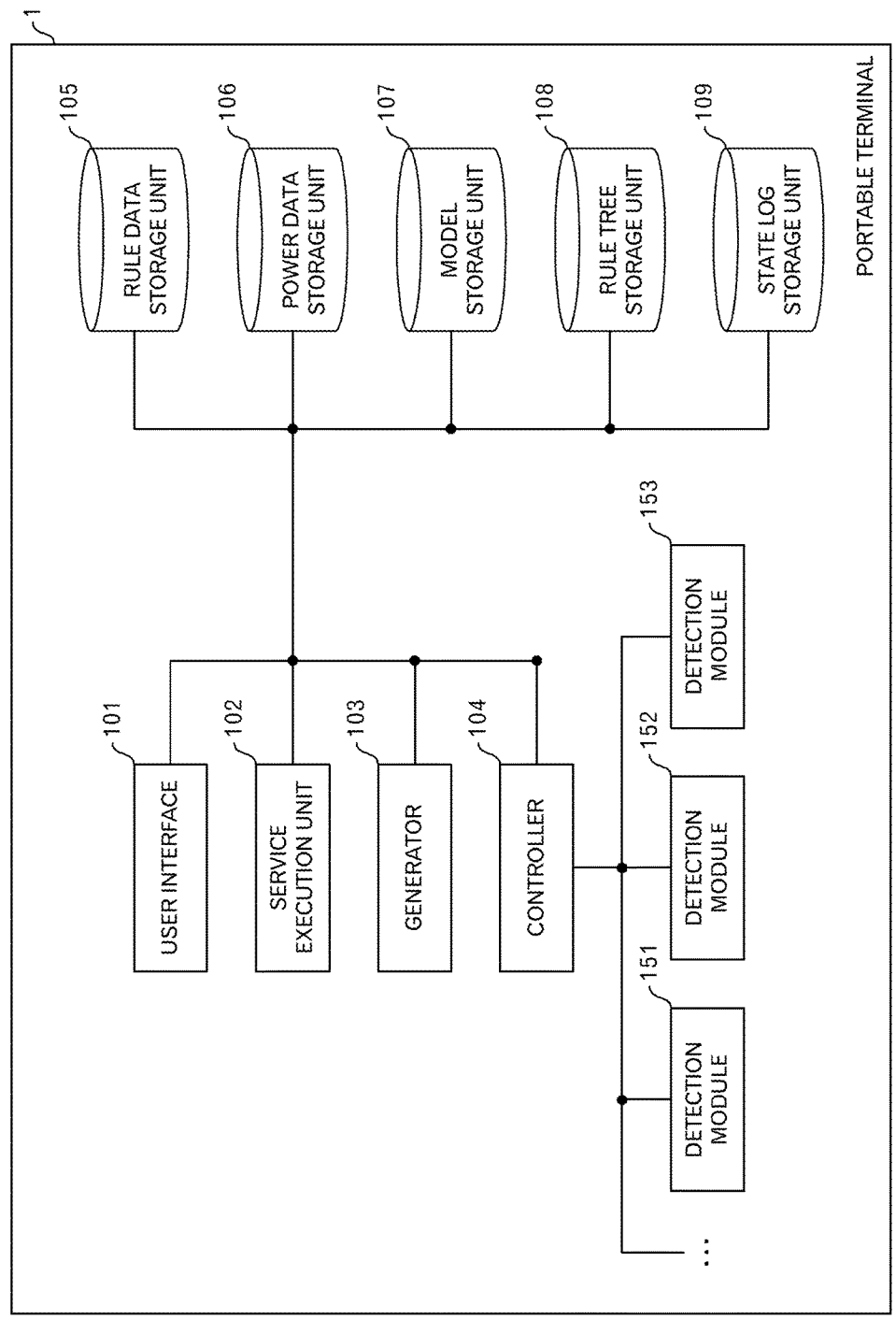
FIG. 1 is a functional block diagram of a portable terminal.

FIG. 1 is a functional block diagram of a portable terminal 1 of this embodiment. The portable terminal 1 has a user interface 101, a service execution unit 102, a generator 103, a controller 104, a rule data storage unit 105, a power data storage unit 106, a model storage unit 107, a rule tree storage unit 108, a state log storage unit 109, and detection modules 151 to 153.

The user interface 101 receives, from a user, input of rules for processing executed by the portable terminal 1, and stores in the rule data storage unit 105. Moreover, the user interface 101 receives, from the user, a deletion instruction to delete a rule, and deletes data of the rule designated in the deletion instruction from the rule data storage unit 105.

The service execution unit 102 executes a service (for example, in this embodiment, activation of an application program or the like) based on an instruction from the controller 104.

The generator 103 generates a rule tree described later based on data that is stored in the rule data storage unit 105, and stores data of the rule tree in the rule tree storage unit 108. Moreover, the generator 103 generates a state transition model described later based on data stored in the power data storage unit 106, data stored in the rule tree storage unit 108 and data stored in the state log storage unit 109, and stores the state transition model in the model storage unit 107.

The controller 104 controls execution of a service by the service execution unit 102 based on data stored in the rule tree storage unit 108. Moreover, the controller 104 controls activation and stop of the detection modules 151 to 153 based on the state transition model that is stored in the model storage unit 107.

The detection modules 151 to 153 are GPS, an acceleration sensor, a microphone and the like, and detect states of the portable terminal 1, the user, an environment or the like. In other words, the detection modules 151 to 153 are modules that have functions for detecting states. The number of detection modules illustrated in FIG. 1 is three, however, the number is not limited.

FIG. 2 illustrates an example of data that is stored in the rule data storage unit 105. In the example in FIG. 2, conditions, identification information of services, and parameters are stored. For example, the rule on the first line is a rule "execute service "α" using parameter "Z" when condition "d1" is satisfied". Identification information of services may be a URL (Uniform Resource Locator) such as "http://xxx.xxx.xxx".

FIG. 3 illustrates an example of data stored in the power data storage unit 106. In the example in FIG. 3, identification information of functions (in other words, detection modules) and data on average power consumption of the detection modules are stored. In this embodiment, one detection module has one function for detecting a state, and detection modules can be identified by identification information of functions.

FIG. 4 illustrates an example of data stored in the state log storage unit 109. In the example in FIG. 4, the time and information that represents change of a state, which occurred at that time, are stored.

Next, an operation of the portable terminal 1 will be explained using FIG. 5 to FIG. 28. First, the operation when receiving input of a rule from a user will be explained.

The user interface 101 of the portable terminal 1 receives input of a rule from a user, and stores data for that rule in the rule data storage unit 105. Then, the user interface 101 gives an instruction to the generator 103 to execute tree generation processing and model generation processing.

Figure 5:
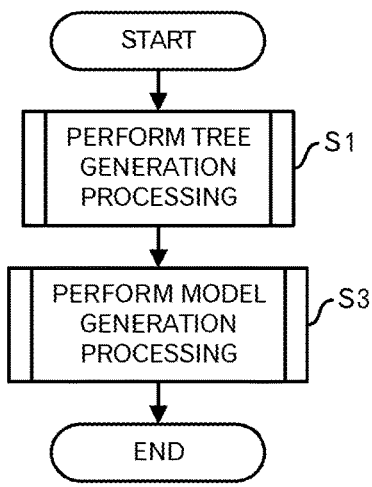
FIG. 5 is a diagram depicting a processing flow of processing performed when receiving input of a rule from a user.

In accordance to this instruction, the generator 103 executes the tree generation processing (FIG. 5: step S1). The tree generation processing will be explained using FIG. 6 to FIG. 10.

Figure 6:
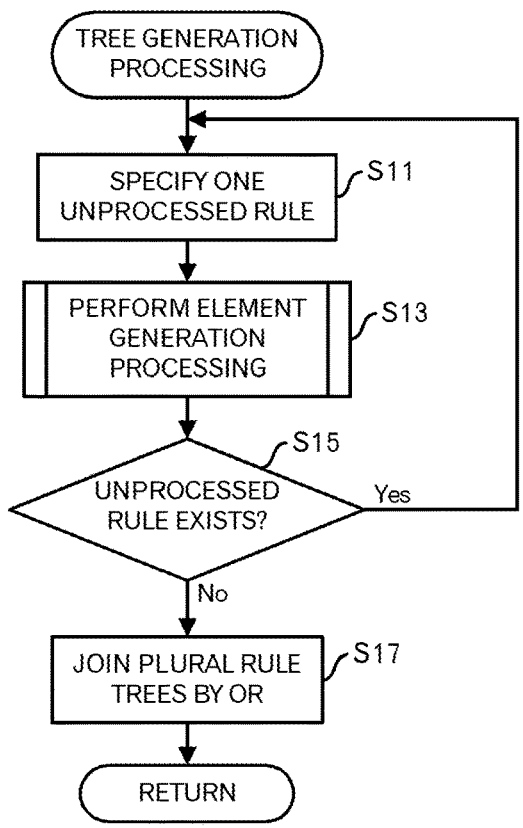
FIG. 6 is a diagram depicting a processing flow of tree generation processing.

First, the generator 103 identifies one unprocessed rule from the rule data storage unit 105 (FIG. 6: step S11). Then, the generator 103 executes element generation processing (step S13). The element generation processing will be explained using FIG. 7 to FIG. 9.

Figure 7:
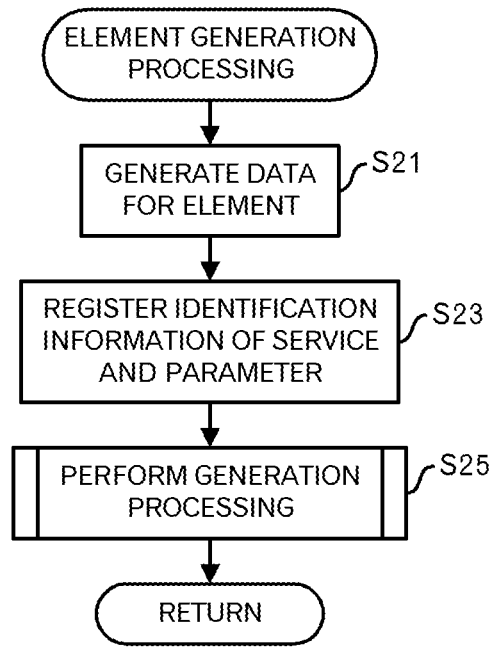
FIG. 7 is a diagram depicting a processing flow of element generation processing.
Figure 8:
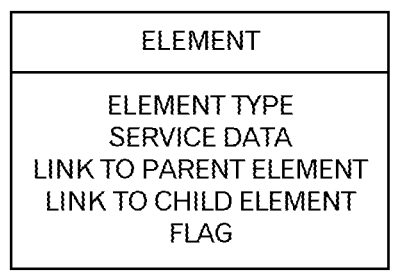
FIG. 8 is a diagram depicting an example of data for an element.

The generator 103 generates element data for conditions included in the identified rule (FIG. 7: step S21). FIG. 8 illustrates an example of element data. In the example in FIG. 8, an element type, service data, link to a parent element (in this embodiment, of the elements that are connected to this element, the element that belongs to a higher level in the rule tree), links to child elements (in this embodiment, of the elements that are connected to this element, the elements that belong to a lower level in the rule tree), and a flag are included. The element type is set to single element, AND (logical product), or OR (logical sum). The service data includes identification information of a service and a parameter. Identification information of a parent element is registered in the link to the parent element. Identification information for child elements is registered in link to the child elements. Data representing whether or not a condition for this element is satisfied is registered in the flag. However, at the time of the step S21, the element data is empty.

The generator 103 registers identification information of a service and a parameter that were included in the rule identified in the step S11 in the element data that was generated in the step S21 (step S23).

The generator 103 executes generation processing (step S25) Then, processing returns to calling-source processing. Here, the generation processing will be explained using FIG. 9.

Figure 9:
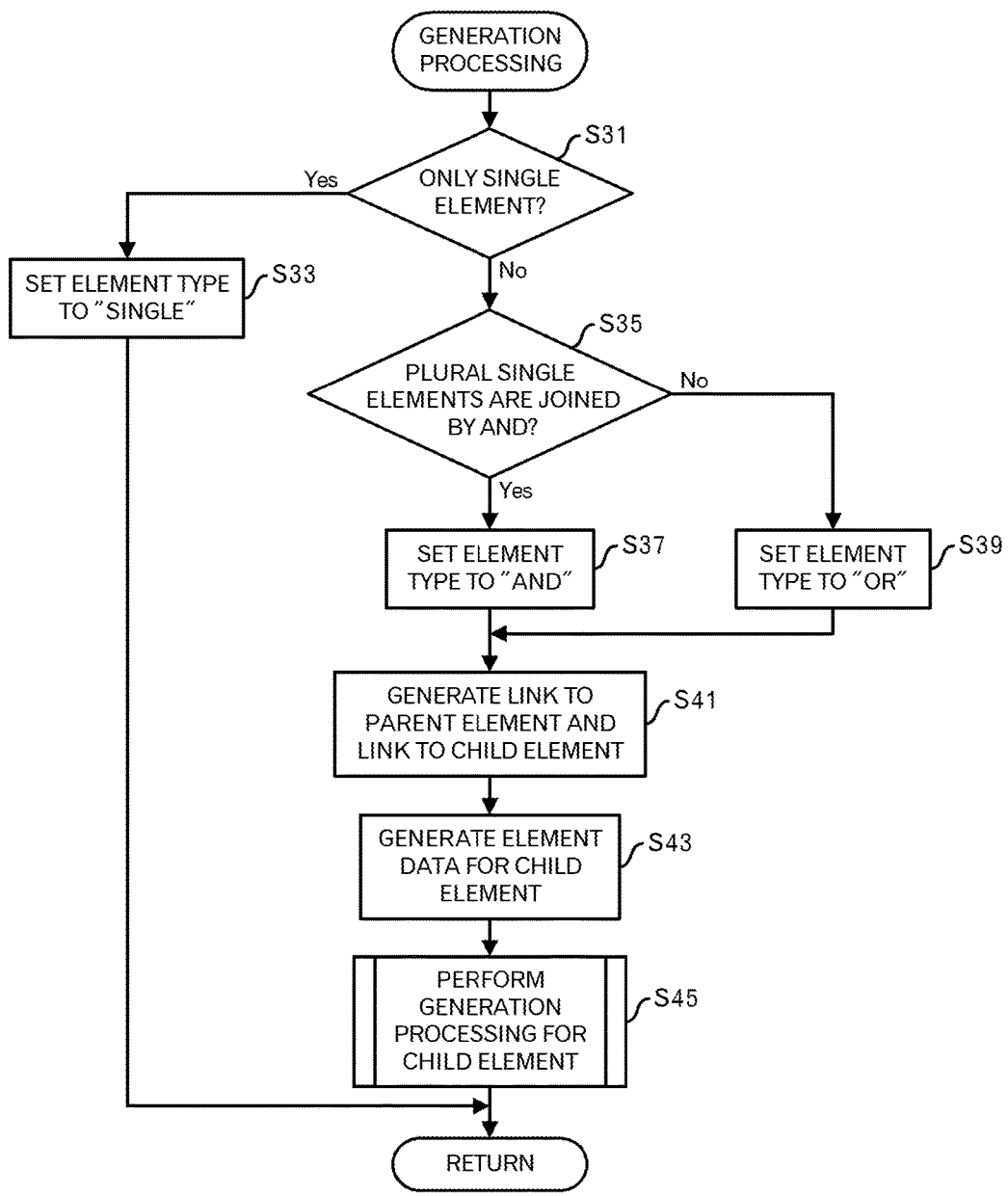
FIG. 9 is a diagram depicting a processing flow of generation processing.

The generator 103 determines whether the element that is included in the rule that was identified in the step S11 is only a single element (FIG. 9: step S31). For example, the rule that is given in line 1 in FIG. 2 includes only a single element d1 in the condition, and it is determined to be "Yes" in the step S31.

When the element is only a single element (step S31: Yes route), the generator 103 sets the element type to "single" in the element data that was generated in the step S21 (step S33).

On the other hand, when the element is not only a single element (step S31: No route), the generator 103 determines whether plural single elements are joined by an AND in the rule that was identified in the step S11 (step S35). For example, the rule given in line 2 in FIG. 2 includes plural single elements that are joined by an AND, and it is determined to be "Yes" in step S35.

When plural single elements are joined by an AND (step S35: Yes route), the generator 103 sets the element type to "AND" in the element data that was generated in the step S21 (step S37).

On the other hand, when plural single elements are not joined by an AND (step S35: No route), the generator 103 sets the element type to "OR" in the element data that was generated in the step S21 (step S39).

The generator 103 generates a link to a parent element and links to child elements, and registers the element data generated in the step S21 (step S41). A parent element is an element that is connected to the element being processed and that is one level above. When there is no parent element, only links to child elements are generated. A child element is an element that is connected to the element being processed and that is one level below. For example, when the element being processed is "AND", child elements are connected by the AND. More specifically, when a condition is "a2 AND c1" and the element being processed is the "AND", child elements are "a2" and "c1".

Generator 103 generates element data for a child element (step S43). Then, the generator 103 executes the generation processing for the child element (step S45). When there are plural child elements, the processing of the step S45 is executed for each of the plural child elements. Processing then returns to the calling-source processing.

By performing processing as described above, one rule tree is generated for one rule. Then the generated rule tree is stored in the rule tree storage unit 108.

Returning to the explanation of FIG. 6, the generator 103 determines whether there are any unprocessed rules in the rule data storage unit 105 (FIG. 6: step S15). When there is an unprocessed rule (step S15; Yes route), the processing returns to the step S11. On the other hand, when there are no unprocessed rules (step S15: No route), the generator 103 obtains plural rule trees from the rule tree storage unit 108 when there are plural rule trees stored in the rule tree storage unit 108, joins the plural rule trees with an OR element (step S17), and stores the result in the rule tree storage unit 108. Then the processing ends. When there are not plural rule trees in the rule tree storage unit 108 (or in other words, when there is one rule for which data is stored in the rule data storage unit 105), the processing of the step S17 is omitted.

Figure 10:
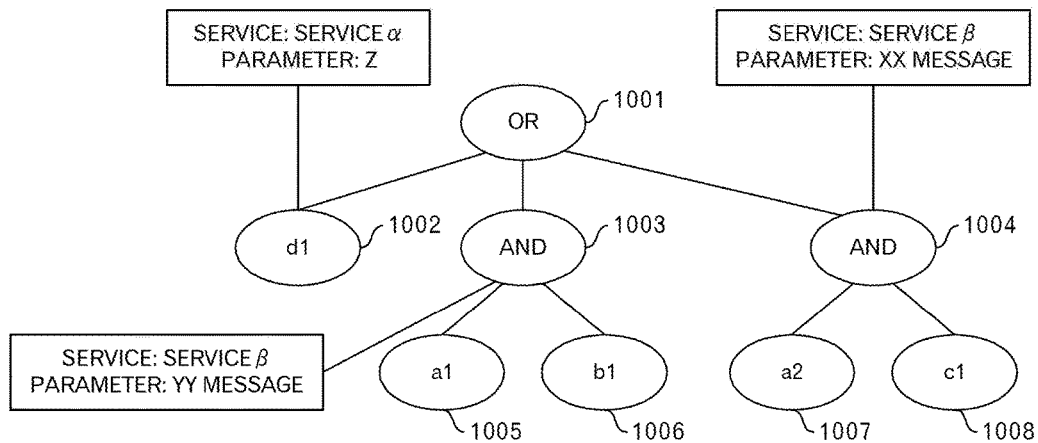
FIG. 10 is a diagram depicting an example of a rule tree.

By executing the processing described above, a rule tree such as illustrated in FIG. 10 is generated, for example. In FIG. 10, elliptical shapes represent elements, and line segments between elements represent connections. A type of an element 1001 is an OR, types of elements 1003 and 1004 are AND, and types of the other elements are single. The rule tree that is illustrated in FIG. 10 is a rule tree that is generated when the data illustrated in FIG. 2 is stored in the rule data storage unit 105. Therefore, there is a rule tree for a condition "d1", a rule tree for a condition "a2 AND c1", and a rule tree for a condition "a1 AND b1", and these rule trees are joined by element 1001. Moreover, identification information of services and parameters are registered for the elements 1002, 1003 and 1004. The element 1001 belongs to a first level, the elements 1002, 1003 and 1004 belong to a second level, and the other elements belong to a third level.

Returning to the explanation of FIG. 5, the generator 103 executes model generation processing (step S3). The model generation processing will be explained using FIG. 11 to FIG. 23.

Figure 11:
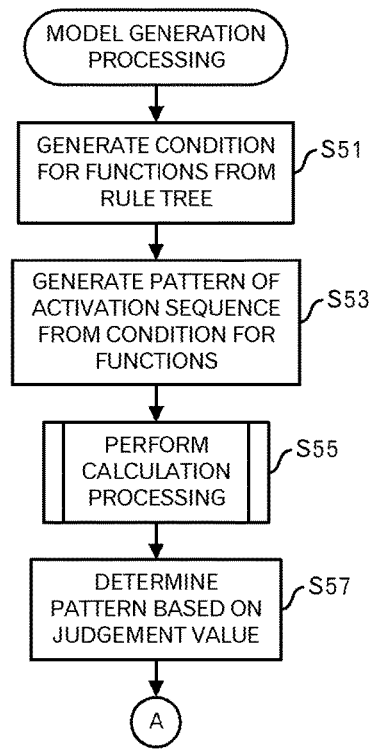
FIG. 11 is a diagram depicting a processing flow of model generation processing.

First, the generator 103 generates a condition for functions from the rule tree that is stored in the rule tree storage unit 108 (FIG. 11: step S51). When generating a condition for functions, detection modules for determining conditions that are joined by an OR are simultaneously activated, and detection modules for determining conditions that are joined by an AND are activated in stages.

Figure 12:
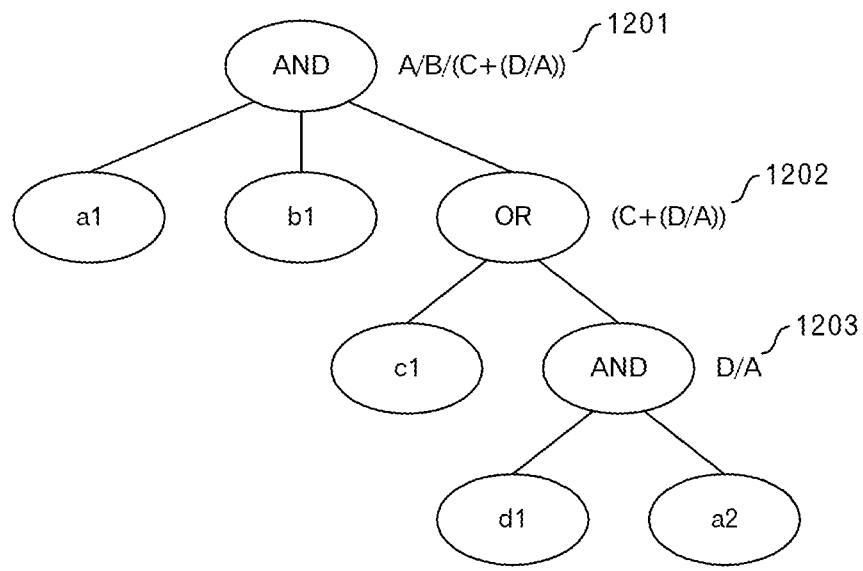
FIG. 12 is a diagram depicting a rule tree and a condition for functions.

For example, when the rule tree is a rule tree illustrated in FIG. 12, a condition 1201 for functions is generated. In FIG. 12, elliptical shapes represent elements, and line segments between elements represent connections. In the condition, "/" represents activation in stages, and "+" represents simultaneous activation. For example, a condition D/A represents that a detection module having a function A is activated after a detection module having a function D is activated, or that the detection module having the function D is activated after the detection module having the function A is activated.

For a rule tree under the OR of the second level in FIG. 12, a condition 1202 is generated as a condition for functions. For a rule tree under the AND in the third level, a condition 1203 is generated as a condition for functions. The condition 1202 is generated by joining a function C for detecting a condition c1 and the condition 1203 with "+". The condition 1201 is generated by joining a function A for detecting a condition a1, a function B for detecting a condition b1 and the condition 1202 with "/".

Figure 13:
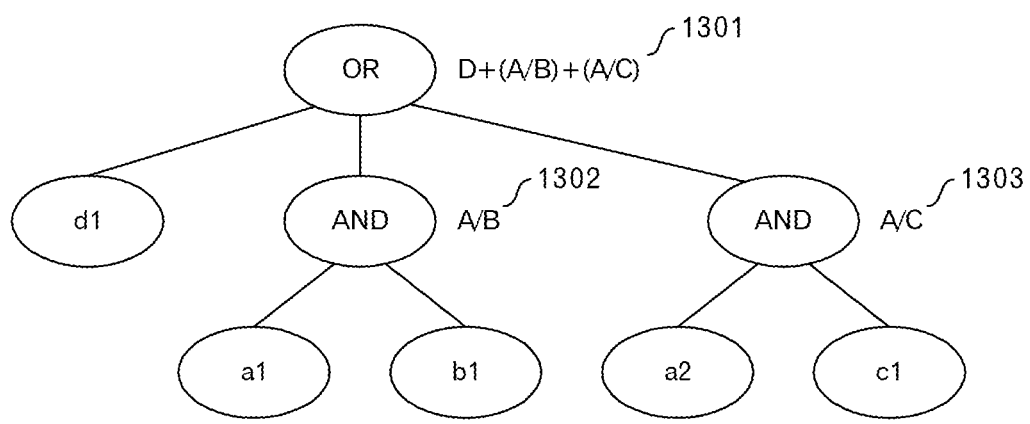
FIG. 13 is a diagram depicting a rule tree and a condition for functions.
Figure 15:
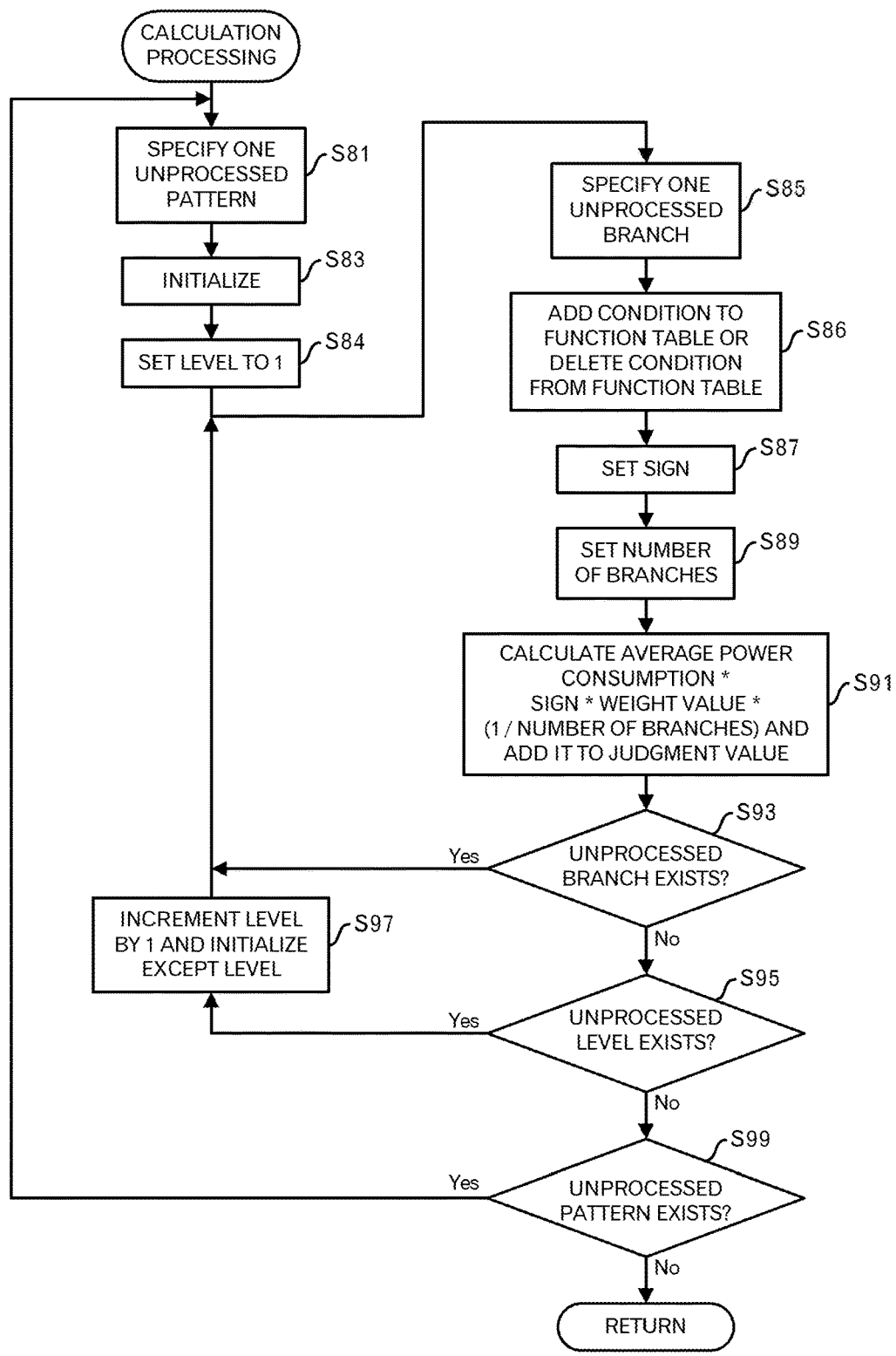
FIG. 15 is a diagram depicting a processing flow of calculation processing.

Moreover, when the rule tree is a rule tree illustrated in FIG. 13, a condition 1301 for functions is generated. The meanings of the shapes and symbols are the same as in FIG. 12. For a rule tree under an AND in the second level in FIG. 13, a condition 1302 is generated as a condition for functions. For a rule tree under an AND in the second level, a condition 1303 is generated as a condition for functions. The condition 1301 is generated by joining a function D for detecting a condition d1, the condition 1302 and the condition 1303 with "+".

The reason for performing processing such as described is that as for OR, a condition for the OR is satisfied even when only one of conditions that are joined by the OR is satisfied. On the other hand, as for AND, a condition for the AND is not satisfied when even one of conditions that are joined by the AND is not satisfied. For example, in the case of a condition "x1 OR y1", a detection module having a function X and a detection module having a function Y are both activated simultaneously. On the other hand, in the case of a condition "x1 AND y1", the detection module having the function X and the detection module having the function Y are activated in stages. The term "in stages" means that when it is confirmed that a condition for a detection module that was activated first is satisfied, the next detection module is activated.

The generator 103 then generates a pattern of activation sequences from the condition for functions that were generated in the step S51 (step S53). More specifically, a pattern of activation sequence is generated in which detection modules having functions for conditions that are joined by "+" are activated simultaneously, and detection modules having functions for conditions that are joined by "/" are activated in stages.

For example, patterns for activation sequences as illustrated in FIG. 14 are generated for the condition 1201 illustrated in FIG. 12, and the patterns are stored in a RAM (Random Access Memory), for example. In the example in FIG. 14, functions that belong to the first level and conditions for which judgement is to be performed by those functions, functions that belong to the second level and conditions for which judgement is to be performed by those functions, functions that belong to the third level and conditions for which judgement is to be performed by those functions, functions that belong to the fourth level and conditions for which judgement is to be performed by those functions, and judgement values are given for each pattern. However, at the point of the step S53, the column for the judgement values is empty.

Detection modules having a function that belongs to the first level are activated first, detection modules having a function that belongs to the second level are activated next, detection modules having a function that belongs to the third level are activated next, and detection modules having a function that belongs to the fourth level are activated next. For example, by data in the first line, a detection module having a function A is activated first, then when a condition a1 is satisfied, a detection module having a function B is activated, then when a condition b1 is satisfied, a detection module having a function C and the detection module having the function A are activated. Then, when a condition c1 is satisfied, the detection module having the function A stops detection for a condition a2, and when the condition a2 is satisfied, a detection module having a function D is activated. In the fourth level of pattern 1, "−A (for a2)" means that the detection module having the function A stops detection for the condition a2.

Then, the generator 103 executes calculation processing (step S55). The calculation processing will be explained using FIG. 15 to FIG. 20.

First, the generator 103 identifies one unprocessed pattern from among the patterns generated in the step S53 (FIG. 15: step S81) (hereafter, referred to as the processing target pattern).

The generator 103 initializes a function table and setting values for the calculation processing (step S83). More specifically, together with emptying the function table, all of the setting values for the calculation processing are set to 0. FIG. 16 illustrates an example of a function table. In the example in FIG. 16, identification information for a function, and conditions that are detected by that function are stored. FIG. 17 illustrates setting values for the calculation processing. In an example in FIG. 17, the number of branches, the judgment value, a sign, and value representing a level are included. The sign is set to +1, 0 or −1 based on processing results of step S86 that will be explained below. The generator 103 then sets the value representing a level of setting values for the calculation processing to 1 (step S84).

The generator 103 identifies one unprocessed branch (hereafter, referred to as a processing target branch) in the target processing level (here, this is a level that is identified by the value that represents a level; for example, the first level when the value that represents a level is 1) (step S85).

The generator 103 adds conditions to the function table or deletes conditions from the function table for the processing target branch (step S86). More specifically, in the processing target branch in the processing target level, when the sign of the function is positive, a condition for that function is added to the function table. On the other hand, in the processing target branch in the processing target level, when the sign of the function is negative, a condition for that function is deleted from the function table.

The generator 103 sets the sign from among the setting values for the calculation processing based on the processing results of the step S86 (step S87). More specifically, when the number of conditions was increased from 0 to 1 due to the processing of the step S86, the sign "+1" is set, when the number of conditions was decreased from 1 to 0 due to the processing of the step S86, the sign "−1" is set, for all other cases, the sign "0" is set.

The generator 103 sets the number of branches from among the setting values for the calculation processing (step S89). The number of branches is the number of branches in the processing target level. For example, in the case of the third level and the fourth level in a pattern 1 in FIG. 14, the number of branches is 2, and in the case of the first level and the second level, the number of branches is 1.

The generator 103 calculates average power consumption of detection modules*sign*weight value*(1/number of branches) for the detection modules for the processing target branch in the processing target level, and adds the result to the judgment value (step S91). When executing the processing of the step S91 for the processing target level for the first time, the judgment value is 0. And the value that is calculated in the step S91 becomes the judgment value. Moreover, the average power consumption is extracted from the power data storage unit 106.

For example, as illustrated in FIG. 18, the higher the level is, the larger the weight value becomes. In this way, the size of the power consumption of a function that belongs to a higher level is more easily reflected on the judgment value than the size of the power consumption of a function that belongs to a lower level. This is because a detection module having a function that belongs to a high level has a higher probability of operating frequently.

Moreover, the weight value may be a value as illustrated in FIG. 19. In the example in FIG. 19, a probability of becoming a certain state is registered as a weight value. A detection module having a function that belongs to the first level always operates, so 1.0 is registered. For the second level, the probability that the state will be detected by a function belonging to the first level (here, this is the probability that the condition a1 is satisfied) is registered. For the third level, the probability that the state will be detected by a function belonging to the first level and that the state will be detected by a function belonging to the second level (here, this is the probability that the condition a1 will be satisfied and that the condition b1 will be satisfied) is registered. The probability is found by using data that is stored in the state log storage unit 109 and dividing the time of that state by a unit time.

The generator 103 then determines whether there is an unprocessed branch in the processing target level (step S93). When there is an unprocessed branch (step S93: Yes route), the processing returns to the processing of the step S85.

On the other hand, when there is no unprocessed branch (step S93: No route), the generator 103 stores the calculated judgment value in the RAM, for example. The generator 103 then determines whether there is an unprocessed level in the processing target pattern (step S95). When there is an unprocessed level (step S95: Yes route), the generator 103 increments the value representing the level by 1 and initializes the function table and setting values for the calculation processing except for the value that represents the level (step S97) The processing then returns to the processing of the step S85.

When there is no unprocessed level (step S95: No route), the generator 103 determines whether there is an unprocessed pattern (step S99). When there is an unprocessed pattern (step S99: Yes route), the processing returns to the processing of the step S81 in order to process the unprocessed pattern. On the other hand, when there is no unprocessed pattern (step S99: No route), the processing returns to the calling-source processing.

By performing processing as described above, judgment values such as illustrated in FIG. 20, for example, are calculated. In an example in FIG. 20, judgment values that represent an estimation for the power consumption of a pattern are calculated for each pattern. In this embodiment, the smaller the judgment value is, the more preferred the pattern is.

Returning to the explanation of FIG. 11, the generator 103 sets a processing target pattern based on the judgment value (step S57). For example, the pattern having the smallest judgment value is the processing target pattern. The processing shifts to step S59 in FIG. 21 by way of terminal A.

Figure 21:
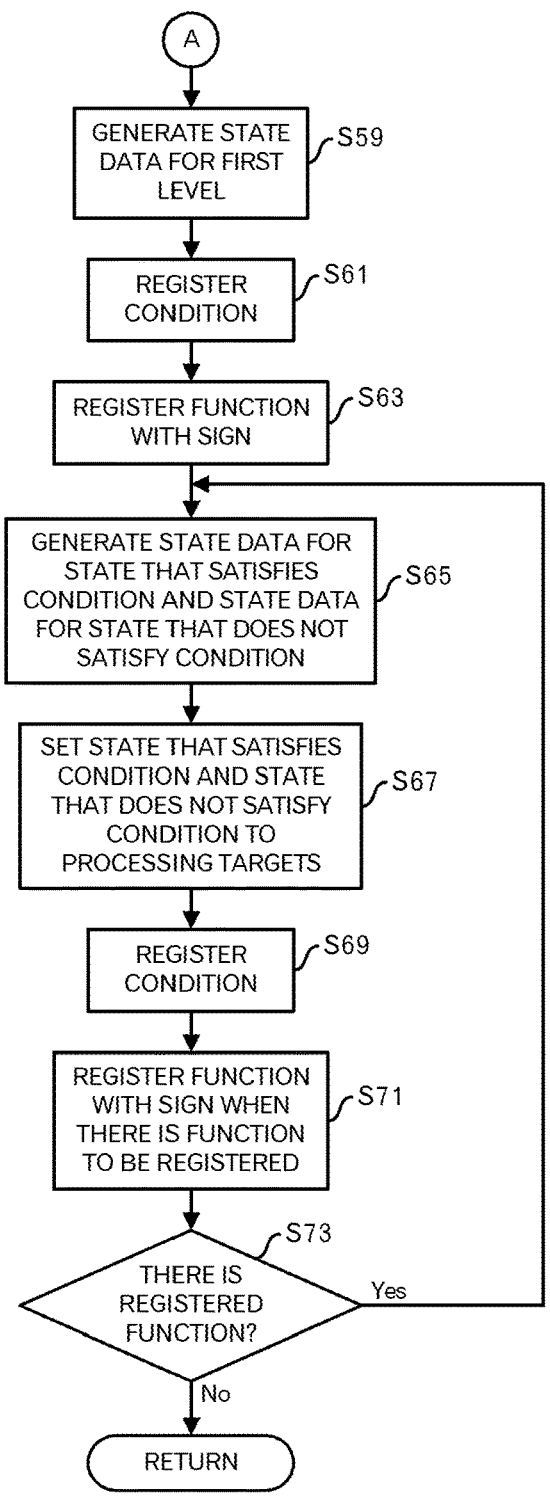
FIG. 21 is a diagram depicting a processing flow of the model generation processing.
Figure 22:
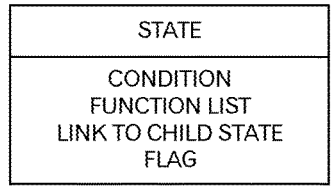
FIG. 22 is a diagram depicting an example of state data.

Shifting to an explanation of FIG. 21, the generator 103 generates state data for the first level in the processing target pattern (step S59) and stores in the model storage unit 107. FIG. 22 illustrates an example of state data. In an example in FIG. 22, a condition, a function list, a link to a child state and a flag are included. The condition is a condition that represents the state (for example, a1). Identification information for functions that are executed in that state is registered in the function list. A condition for functions in one level below is registered in the link to a child state. A flag is data that represents whether or not the state is that state.

Moreover, the generator 103 registers, in the state data, a condition for functions belonging to the first level in the processing target pattern (step S61). Furthermore, the generator 103 then registers, in the function list in the state data, functions with signs (step S63). However, when the sign is positive, the sign may not be attached.

The generator 103 generates state data for a state that satisfies the condition for registered functions, and state data for a state that does not satisfy the condition for registered functions (step S65), and stores that state data in the model storage unit 107.

The generator 103 sets a state that satisfies the condition for the registered functions and a state that does not satisfy the condition for the registered functions as the processing targets (step S67).

The generator 103 registers a condition representing the processing target state in the state data for the state of the processing target (step S69). Moreover, the generator 103 registers functions with signs in the state data for the state of the processing target when there are functions in the identified level (step S71).

The generator 103 determines whether there is a registered function (in other words, whether the processing of step S71 has been executed) (step S73). When there is a registered function (step S73: Yes route), the processing returns to the step S65 in order to process that function. On the other hand, where there is no registered function (step S73: No route), the processing returns to the calling-source processing, and the processing illustrated in FIG. 5 ends.

When processing such as described above is performed, state data is stored in the model storage unit 107 for plural states.

Figure 23:
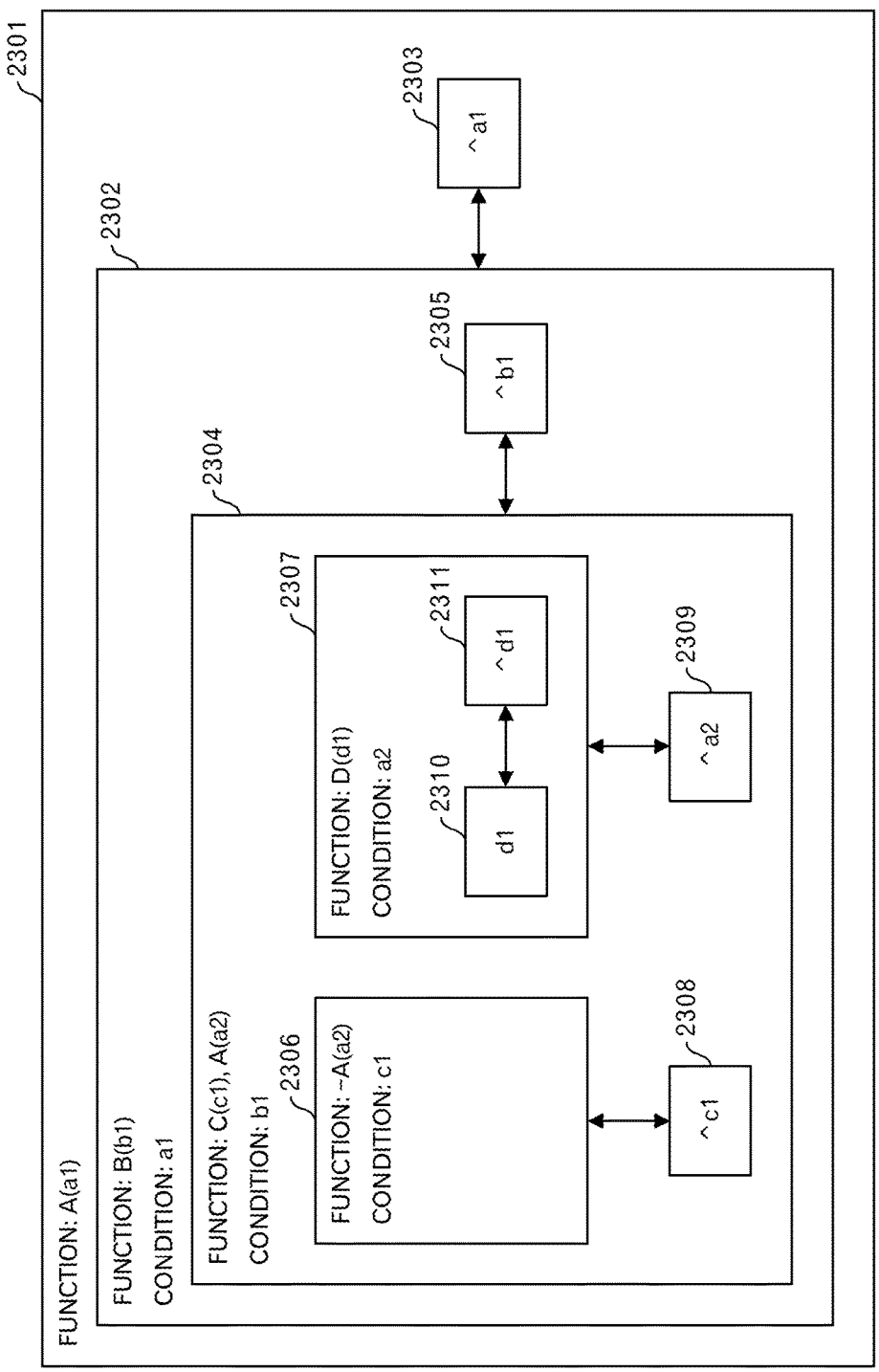
FIG. 23 is a diagram for explaining a relationship among state data.

A relationship between state data will be explained using FIG. 23. FIG. 23 illustrates state data 2301 to 2311 that was generated for each state in the pattern 1 illustrated in FIG. 14.

The relationship between state data 2301 and state data 2302 and 2303 is a parent-child relationship, where state data 2301 is a parent, and state data 2302 and 2303 are children. Similarly, the relationship between state data 2302 and state data 2304 and 2305 is a parent-child relationship, where state data 2302 is a parent, and state data 2304 and 2305 are children. Similarly, the relationship between state data 2304 and state data 2306 to 2309 is a parent-child relationship, where state data 2304 is a parent, and state data 2306 to 2309 are children. Similarly, the relationship between state data 2307 and state data 2310 and 2311 is a parent-child relationship, where state data 2307 is a parent, and state data 2310 and 2311 are children. In FIG. 23, the symbol "^" represents that a condition has not been satisfied. Moreover, in the example in FIG. 23, a positive sign is not attached to functions.

Next, the processing by the controller 104 for activating and stopping the detection modules 151 to 153 will be explained using FIG. 24 and FIG. 25. However, in order to simplify the explanation, in the following, the signs of the functions registered in the state transition model are only positive.

Figure 24:
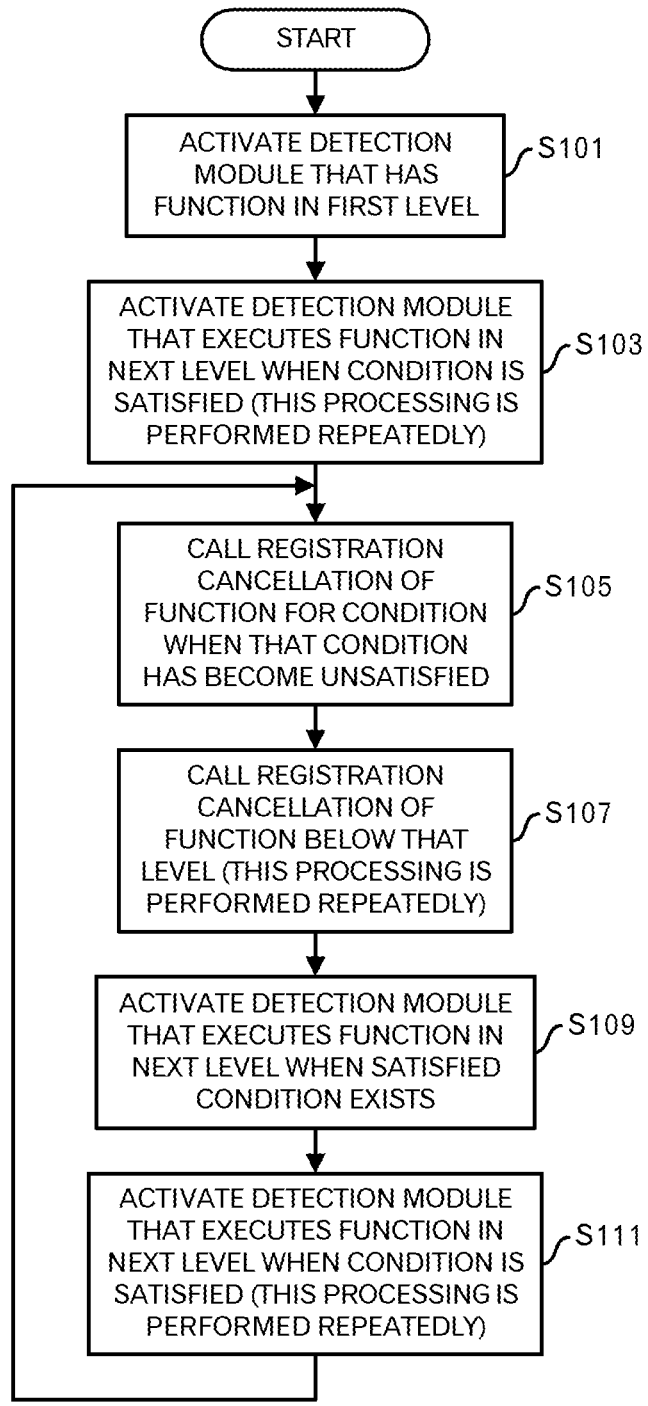
FIG. 24 is a diagram depicting a processing flow of processing performed by controller.

The controller 104 activates the detection modules having a function in the first level of the state transition model (FIG. 24: step S101). More specifically, the registration method for a detection module having a function in the first level is called. Moreover, the detection module having a function in the first level registers conditions for which judgment is to be performed, and increments the number of times the condition is used by 1. A flag is set in the state data for the present state representing that the state is that state.

Figure 25:
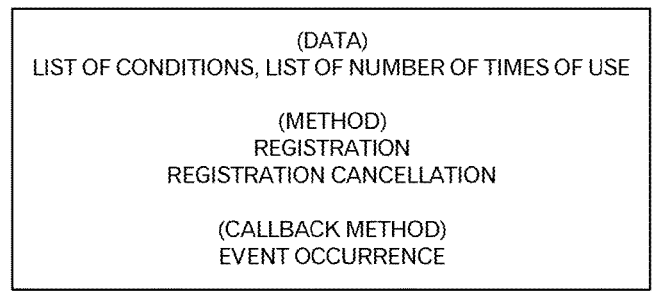
FIG. 25 is a diagram depicting an example of data and a method that a detection module has.

FIG. 25 illustrates an example of data, methods and callback methods that the detection modules 151 to 153 have. In the example in FIG. 25, the data includes a list of conditions, and a list of the number of times of use for the condition, the methods include the registration method and registration cancellation method, the callback methods includes a callback method of event occurrence.

When a detection module having a function in the first level detects that a condition for a function in the first level has been satisfied, the detection module notifies the controller 104 by the callback method of event occurrence. Accordingly, the controller 104 activates a detection module having a function in the next level (here, this is the second level) (step S103). More specifically, the controller 104 calls a registration method for the detection module having a function in the second level. Moreover, the detection module having a function in the second level registers a condition for which judgment is to be performed, and increments the number of times the condition has been used by 1. However, when a condition for which judgment is to be performed is already registered, registration is not performed. The processing of step S103 is repeatedly performed for the third level, fourth level, fifth level and so on until there are no more levels.

Here, when a detection module having a function in an mth level (m is a natural number 2 or greater) detects that the condition for the function in the first level is not satisfied, the detection module notifies the controller 104 by the callback method of event occurrence. Accordingly, the controller 104 calls the registration cancellation method for the detection module having a function in the mth level (step S105). The detection module having a function in the mth level decrements the number of times the condition for which judgment is to be performed is used by 1. When the number of times becomes 0, the condition is deleted. Moreover, when the number of registered conditions becomes 0, the detection module stops.

The controller 104 calls the registration cancellation method for functions of the level below the mth level (step S107). Moreover, a detection module for which the registration cancellation method was called decrements the number of times the condition for which judgment is to be performed by 1. When the number of times becomes 0, the condition is deleted. When the number of registered conditions becomes 0, the detection module stops. Moreover, the processing of step S107 is repeatedly performed until there are no more levels below the mth level.

Here, when a detection module having a function in the lth level (l is a natural number 2 or greater) detects that a condition for a function in the lth level has been satisfied, the detection module notifies the controller 104 by the callback method of event occurrence. Accordingly, the controller 104 activates a detection module having a function in the (l+1)th level (step S109). More specifically, the registration method for the detection module having a function in the (l+1)th level is called. Moreover, the detection module having a function in the (l+1)th level registers a condition for which judgment is to be performed, and increments the number of times of use for the condition by 1. However, when a condition for which judgment is to be performed is already registered, registration is not performed.

When a detection module having a function in the (l+1)th level detects that a condition for a function in the (l+1)th level has been satisfied, the detection module notifies the controller 104 by the callback method of event occurrence. Accordingly, the controller 104 activates a detection module having a function in the next level (here, the (l+2)th level) (step S111). More specifically, the controller 104 calls the registration method of the detection module having the function in the (l+2)th level. Moreover, the detection module having the function in the (l+2)th level registers a condition for which judgment is to be performed, and increments the number of times of use for the condition by 1. However, when a condition for which judgment is to be performed is already registered, registration is not performed. The processing of step S111 is repeatedly performed for the (l+3)th level, (l+4)th level, (l+5)th level and so on until there are no more levels. The processing then returns to the processing of the step S105.

By performing processing as described above, even when plural detection modules are used for determining whether or not conditions are satisfied, the detection modules are activated in stages. Therefore, not all of the plural detection modules are activated from the beginning. As a result, it is possible to reduce the power consumed for detecting states in a portable terminal 1. In the above, a case was explained in which signs for functions registered in the state transition model are only positive, however, the signs may be negative. When the sign is negative, the controller 104 calls the registration cancellation method.

Here, the condition "a1 AND b1" will be used to explain suppression of power consumption in more detail. An amount of battery power decreases 1% per hour due to the detection model having the function A for the condition "a1", when a full battery state is used as a reference state. An amount of power of the battery decreases 3% per hour due to the detection model having the function B for the condition "b1", when the full battery state is used as a reference state.

When both detection modules are activated at the same time and allowed to operate for 24 hours, the amount of power of the battery is reduced by (1+3)*24=96%.

On the other hand, assume that order is used in which after the detection module having the function A has been activated, the detection module having the function B is activated, and a time period in which the condition "a1" is satisfied is only 1 hour during a 24-hour period. As a result, the amount of power is reduced by only 1*24+3*1=27%. Therefore, by performing the processing of this embodiment, it is possible to suppress the reduction in the amount of power more than when the two detection modules are activated at the same time and continuously operated.

Moreover, processing will be explained in which the controller 104 controls execution of a service by a service execution unit 102. When the controller 104 receives a notification from a detection module by a callback method of event occurrence, the controller 104 changes the flag of the corresponding element in the rule tree in the rule tree storage unit 108. When a condition of a rule that is registered in the rule data storage unit 105 is satisfied due to the change in the flag, the controller 104 gives identification information of a service and a parameter to the service execution unit 102. The service execution unit 102 then uses the parameter to execute the service. Moreover, judgment is also performed for a parent element of the element for which the flag was changed to determine whether or not the condition is satisfied. For an AND element, when all of the subordinate conditions are satisfied, a flag representing that the condition is satisfied is registered. On the other hand, for an OR element, when one of the subordinate conditions is satisfied, a flag representing that the condition is satisfied is registered. This processing is repeatedly performed up until the highest-level element.

[Embodiment 2]

In the first embodiment, a judgment value was found for each pattern, and based on the judgment values, a pattern for an activation sequence was determined. On the other hand, in the second embodiment, an activation sequence is used in which the lower the average power consumption of a detection module is the earlier the detection module is activated.

Figure 26:
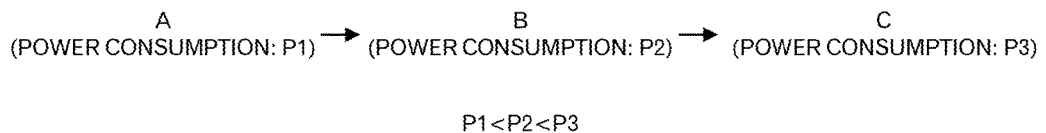
FIG. 26 is a diagram for explaining a method for determining a sequence in a second embodiment.

The method for determining activation order in this second embodiment will be explained using FIG. 26. In an example in FIG. 26, a relationship P1<P2<P3 holds among power consumption P1 of a detection module having the function A, power consumption P2 of a detection module having the function B, and power consumption P3 of a detection module having the function C. In such a case, in this second embodiment, the detection module having the function A is activated first, the detection module having the function B is activated next, and the detection module having the function C is activated last.

Thus, a frequency of activating detection modules having large power consumption than other detection modules becomes less, and it becomes possible to reduce overall power consumption.

Figure 27:
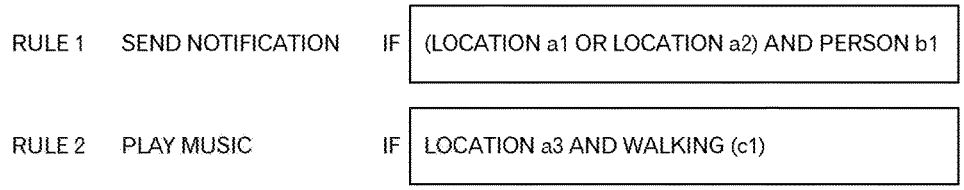
FIG. 27 is a diagram depicting an example of a rule.

Moreover, consider that the processing of this second embodiment is also applied to a case in which plural rules are registered. For example, rule 1 and rule 2 are registered in the rule data storage unit 105 such as illustrated in FIG. 27. Rule 1 is a rule to "send a notification when person b1 is met at location a1 or location a2", and rule 2 is a rule to "play music when walking (c1) at location a3". The conditions "location a1", "location a2" and "location a3" are judged by the detection module having the function A that detects position, the condition "person b1" are judged by the detection module having the function B that detects people, and the condition "walking (c1)" is judged by the detection module having the function C that detects action.

Figure 28:
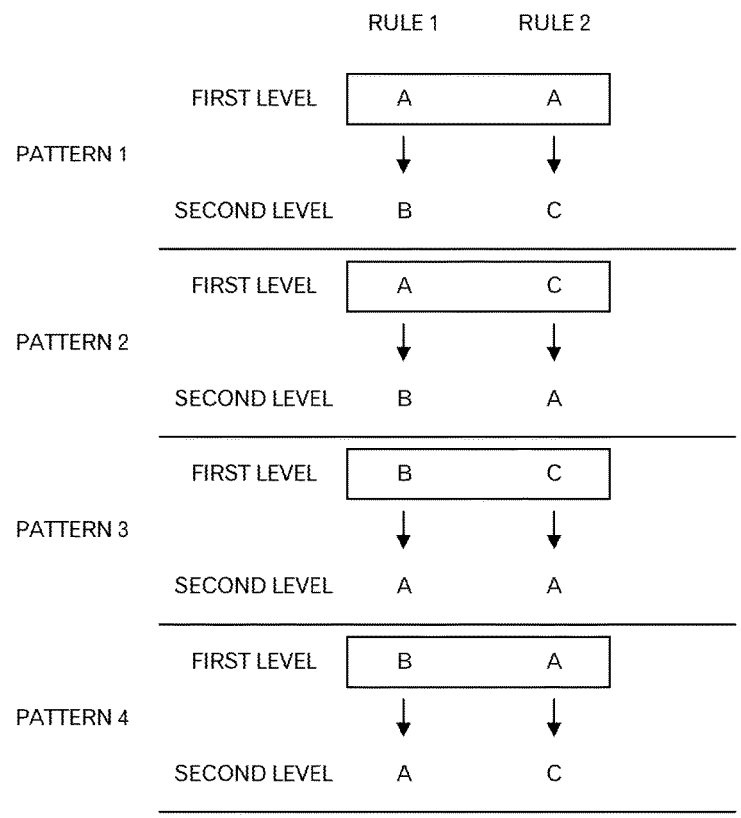
FIG. 28 is a diagram depicting an example of processing in a case where plural rules has been registered.

Four patterns illustrated in FIG. 28 are generated from the rule 1 and the rule 2. In pattern 1, the detection module having the function A for the rule 1 and the rule 2 in the first level is activated, the detection module having the function B for the rule 1 in the second level is activated, and the detection module having the function C for the rule 2 in the second level is activated. In pattern 2, the detection module having the function A for the rule 1 in the first level is activated, the detection module having the function C for the rule 2 in the first level is activated, the detection module having the function B for the rule 1 in the second level is activated, and the detection module having the function A for the rule 2 in the second level is activated. In pattern 3, the detection module having the function B for the rule 1 in the first level is activated, the detection module having the function C for the rule 2 in the first level is activated, the detection module having the function A for the rule 1 in the second level is activated, and the detection module having the function A for the rule 2 in the second level is activated.

In pattern 4, the detection module having the function B for the rule 1 in the first level is activated, the detection module having the function A for the rule 2 in the first level is activated, the detection module having the function A for the rule 1 in the second level is activated, and the detection module having the function C for the rule 2 in the second level is activated.

In the pattern 1, only the detection module having the function A in the first level is activated; in the pattern 2, the detection module having the function A and the detection module having the function C in the first level are activated; in the pattern 3, the detection module having the function B and the detection module having the function C in the first level are activated; and in the pattern 4, the detection module having the function B and the detection module having the function A in the first level are activated. Therefore, when the power consumption of the detection module having the function A is less than the total power consumption of the detection module having the function B and the detection module having the function C, the power consumption of the first level in the pattern 1 becomes the least. Consequently, by applying the processing of this second embodiment, the pattern 1 is used as the most preferred pattern.

Here, an example of use of a portable terminal 1 will be explained in detail. For example, assume that a rule "play music appropriate for jogging when a user of the portable terminal 1 is jogging around a park" is registered by the user. The condition "around a park" is detectable by a geofencing function of GPS, and the condition "running" is detectable by a walking detection function of an acceleration sensor. Moreover, the power consumption of GPS is greater than the average power consumption of the acceleration sensor.

In this case, in the state transition model, when the level of the walking detection function is higher than the level of the geofencing function, GPS operates only while the condition of running is satisfied. Thus, it is possible to suppress an increase in power consumption.

Furthermore, for example, the service provider has registered a rule to "distribute sale information when the portable terminal 1 is near a shopping center" in the portable terminal 1. As a result, the rule 1 and the rule 2 are registered in the portable terminal 1. The condition "near a shopping center" can be detected by the geofencing function of GPS. By performing the processing of this embodiment, the condition of the rule 1 and the condition of the rule 2 are joined by an OR, and a state transition model is regenerated. In this state transition model, the level of the geofencing function is higher than the level of the walking detection function. Thus, it is possible to perform judgment for both the condition of rule 1 and the condition of rule 2.

Although the embodiments of this invention were explained above, this invention is not limited to those. For example, the functional block configuration of the portable terminal 1, which is explained above, does not always correspond to actual program module configuration.

Moreover, the configurations of the respective tables are mere example, and may be changed. Furthermore, as for the processing flow, as long as the processing results do not change, the turns of the steps may be exchanged or the steps may be executed in parallel.

Moreover, a server of a provider or the like may also register a rule in the rule data storage unit 105 of the portable terminal 1.

Figure 29:
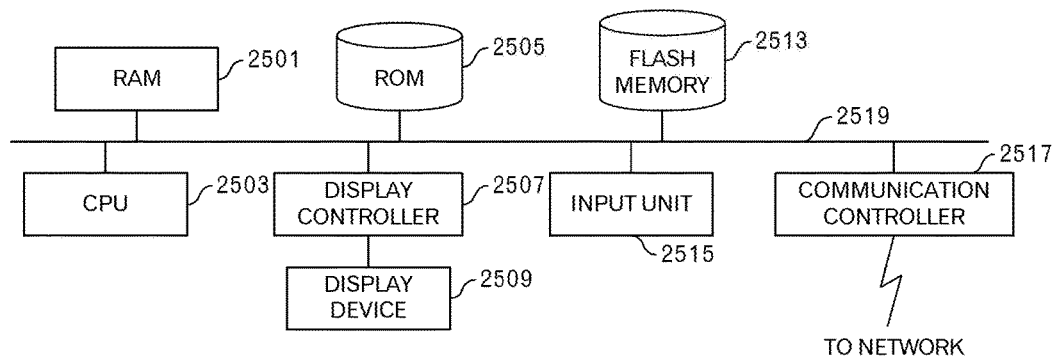
FIG. 29 is a functional block diagram of a computer.

In addition, the aforementioned portable terminal 1 is computer device as illustrated in FIG. 29. That is, a RAM 2501 (storage device), a central processing unit (CPU) 2503 (processor), a read only memory (ROM) 2505, a display controller 2507 connected to a display device 2509, a flash memory 2513, an input unit 2515, and a communication controller 2517 for connection with a network are connected through a bus 2519 as illustrated in FIG. 29. An operating system (OS) and an application program for carrying out the foregoing processing in the embodiment, are stored in the ROM 2505 or the flash memory 2513, and when executed by the CPU 2503, they are read out from the ROM 2505 or the flash memory 2513 to the RAM 2501. As the need arises, the CPU 2503 controls the display controller 2507 and the communication controller 2517, and causes them to perform predetermined operations. Moreover, intermediate processing data is stored in the RAM 2501, and if necessary, it is stored in the flash memory 2513. In this embodiment of this technique, the application program to realize the aforementioned processing is installed into the flash memory 2513 via the network such as the Internet and the communication controller 2517. In the computer device as stated above, the hardware such as the CPU 2503 and the RAM 2501, the OS and the application programs systematically cooperate with each other, so that various functions as described above in details are realized.

The aforementioned embodiment is summarized as follows:

A portable terminal relating to a first aspect of this embodiment includes: (A) plural detection modules each of which is configured to detect a state; (B) a determination unit configured to determine a sequence of activation of the plural detection modules, for a first condition related to results of detection by the plural detection modules; and (C) an activation unit configured to activate a detection module that is a first in the sequence, and to activate a certain detection module other than the detection module that is the first in the sequence, upon detecting that a result of detection by a first detection module whose turn in the sequence is immediately before a turn of the certain detection module satisfies a second condition which corresponds to the first detection module and is included in the first condition.

Even when using plural detection modules for determining that whether a certain condition is satisfied or not, all of the plural detection modules do not always have to be activated from the beginning. Thus, as aforementioned above, by activating detection modules one by one, it becomes possible to reduce power consumed by detecting state in the portable terminal.

Moreover, the sequence may be a sequence in which the certain detection module is activated before activation of a detection module whose power consumption is greater than power consumption of the certain detection module. By performing such processing, it becomes possible to reduce power consumption of the portable terminal because an amount of time in which a detection module whose power consumption is greater than that of other detection modules operates becomes shortened.

Moreover, the sequence may be a sequence in which detection modules that correspond to third conditions which are joined by a logical sum and are included in the first condition are activated simultaneously, and detection modules that correspond to fourth conditions which are joined by a logical product and are included in the first condition are activated in stages. As for OR, a condition for the OR is satisfied even when only one of conditions that are joined by the OR is satisfied. On the other hand, as for AND, a condition for the AND is not satisfied when at least one of conditions that are joined by the AND is not satisfied. Therefore, by performing processing as described above, it becomes possible to operate minimum detection modules.

Moreover, the determination unit may further be configured to: (b1) generate plural sequences of activation of the plural detection modules for the first condition; (b2) calculate, for each of the plural sequences, a total sum of values which are calculated by multiplying, for each of the plural detection modules, power consumption of the detection module by a weight value for the detection module; and (b3) select a sequence whose total sum is less than a predetermined value from among the plural sequences. And a weight value for the certain detection module may be larger than a weight value of a detection module that is activated after activation of the certain detection module. The prior a turn of a detection module is, the greater a possibility to activate the detection module becomes. Therefore, a greater portion of power consumption of the portable terminal is occupied. Accordingly, by performing processing as described above, it becomes possible to select a sequence that enables to reduce power consumption.

Moreover, the determination unit may further be configured to: (b4) generate plural sequences of activation of the plural detection modules for the first condition; (b5) calculate, for each of the plural sequences, a total sum of values which are calculated by multiplying, for each of the plural detection modules, power consumption of the detection module by a weight value for the detection module; and (b6) select a sequence whose total sum is less than a predetermined value from among the plural sequences. And a weight value for each of the plural detection modules is a probability of occurrence of a state that satisfies a condition corresponding to the detection module. Even when power consumption of a detection module is low, an overall power consumption may become high because the next detection modules is frequently activated, if a state that satisfies a condition occur frequently. Thus, by performing processing as described above, it becomes possible to select a sequence that enables to reduce power consumption.

Moreover, the determination unit may further be configured to: (b7) determine, upon detecting plural conditions related to results of detection by the plural detection modules, one sequence of activation of the plural detection modules for the plural conditions, based on power consumption of each of the plural detection modules. By performing such processing, it becomes possible to determine a sequence that enables to reduce power consumption, even when detecting the plural conditions related to the results of detection by the plural detection modules.

An activation method relating to a second aspect of this embodiment includes: (D) determining a sequence of activation of plural detection modules each of which is configured to detect a state, for a first condition related to results of detection by the plural detection modules; (E) first activating a detection module that is a first in the sequence; and (F) second activating a certain detection module other than the detection module that is the first in the sequence, upon detecting that a result of detection by a first detection module whose turn in the sequence is immediately before a turn of the certain detection module satisfies a second condition which corresponds to the first detection module and is included in the first condition.

Incidentally, it is possible to create a program causing a computer to execute the aforementioned processing, and such a program is stored in a computer readable storage medium or storage device such as a flexible disk, CD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A portable terminal, comprising:
   a plurality of detection modules each of which is configured to detect a state;
   a memory; and
   a processor configured to use the memory and execute a process, the process comprising:
   generating a plurality of sequences of activation of the plurality of detection modules, based on first data that includes a plurality of conditions each of which is a condition for a state that is to be detected by one of the plurality of detection modules;
   calculating, for each of the plurality of sequences, a total sum of values which are calculated by multiplying, for each of the plurality of detection modules, power consumption of the detection module by a weight value;
   selecting a sequence whose total sum is less than a predetermined value from among the plurality of sequences;
   first activating a detection module that is a first in the selected sequence; and
   second activating a certain detection module other than the detection module that is the first in the selected sequence, upon detecting that a state that has been detected by a detection module whose turn in the selected sequence is immediately before a turn of the certain detection module satisfies one of the plurality of conditions.

2. The portable terminal as set forth in claim 1, wherein the selecting comprises selecting, from among the plurality of sequences, a sequence whose total sum is less than the predetermined value and in which the certain detection module is activated before activation of a detection module whose power consumption is greater than power consumption of the certain detection module.

3. The portable terminal as set forth in claim 1, wherein the selecting comprises selecting, from among the plurality of sequences, a sequence whose total sum is less than the predetermined value and in which detection modules that detect states for conditions which are joined by a logical sum and are included in the first data are activated simultaneously and detection modules that detect states for conditions which are joined by a logical product and are included in the first data are activated in stages.

4. The portable terminal as set forth in claim 1, wherein a weight value that is multiplied by power consumption of each of the plurality of detection modules is a value that is greater than a weight value that is multiplied by power consumption of a detection module that is activated after activation of the detection module, or a probability of occurrence a state that is to be detected by the detection module.

5. A non-transitory computer-readable storage medium storing a program for causing a portable terminal to execute a process, the process comprising:

generating a plurality of sequences of activation of the plurality of detection modules, based on first data that includes a plurality of conditions each of which is a condition for a state that is to be detected by one of the plurality of detection modules;

calculating, for each of the plurality of sequences, a total sum of values which are calculated by multiplying, for each of the plurality of detection modules, power consumption of the detection module by a weight value;

selecting a sequence whose total sum is less than a predetermined value from among the plurality of sequences;

first activating a detection module that is a first in the selected sequence; and second activating a certain detection module other than the detection module that is the first in the selected sequence, upon detecting that a state that has been detected by a detection module whose turn in the selected sequence is immediately before a turn of the certain detection module satisfies one of the plurality of conditions.

6. The non-transitory computer-readable storage medium as set forth in claim 5, wherein the selecting comprises selecting, from among the plurality of sequences, a sequence whose total sum is less than the predetermined value and in which the certain detection module is activated before activation of a detection module whose power consumption is greater than power consumption of the certain detection module.

7. The non-transitory computer-readable storage medium as set forth in claim 5, wherein the selecting comprises selecting, from among the plurality of sequences, a sequence whose total sum is less than the predetermined value and in which detection modules that detect states for conditions which are joined by a logical sum and are included in the first data are activated simultaneously and detection modules that detect states for conditions which are joined by a logical product and are included in the first data are activated in stages.

8. The non-transitory computer-readable storage medium as set forth in claim 5, wherein a weight value that is multiplied by power consumption of each of the plurality of detection modules is a value that is greater than a weight value that is multiplied by power consumption of a detection module that is activated after activation of the detection module, or a probability of occurrence a state that is to be detected by the detection module.

9. An activation method, comprising:

generating, by using a processor, a plurality of sequences of activation of the plurality of detection modules, based on first data that includes a plurality of conditions each of which is a condition for a state that is to be detected by one of the plurality of detection modules;

calculating, by using the processor and for each of the plurality of sequences, a total sum of values which are calculated by multiplying, for each of the plurality of detection modules, power consumption of the detection module by a weight value;

selecting, by using the processor, a sequence whose total sum is less than a predetermined value from among the plurality of sequences;

first activating, by using the processor, a detection module that is a first in the selected sequence; and second activating, by using the processor, a certain detection module other than the detection module that is the first in the selected sequence, upon detecting that a state that has been detected by a detection module whose turn in the selected sequence is immediately before a turn of the certain detection module satisfies one of the plurality of conditions.

10. The activation method as set forth in claim 9, wherein the selecting comprises selecting, from among the plurality of sequences, a sequence whose total sum is less than the predetermined value and in which the certain detection module is activated before activation of a detection module whose power consumption is greater than power consumption of the certain detection module.

11. The activation method as set forth in claim 9, wherein the selecting comprises selecting, from among the plurality of sequences, a sequence whose total sum is less than the predetermined value and in which detection modules that detect states for conditions which are joined by a logical sum and are included in the first data are activated simultaneously and detection modules that detect states for conditions which are joined by a logical product and are included in the first data are activated in stages.

12. The activation method as set forth in claim 9, wherein a weight value that is multiplied by power consumption of each of the plurality of detection modules is a value that is greater than a weight value that is multiplied by power consumption of a detection module that is activated after activation of the detection module, or a probability of occurrence a state that is to be detected by the detection module.

* * * * *